United States Patent [19]
Ostermann

[11] Patent Number: 5,646,689
[45] Date of Patent: Jul. 8, 1997

[54] VIDEO ENCODER WITH FEEDBACK CONTROL

[75] Inventor: Joern Ostermann, Red Bank, N.J.

[73] Assignee: Lucent Technologies Inc., Murray Hill, N.J.

[21] Appl. No.: 546,853

[22] Filed: Oct. 23, 1995

[51] Int. Cl.⁶ .................................................. H04N 7/36
[52] U.S. Cl. ........................... 348/405; 348/415; 348/412
[58] Field of Search ................................. 348/394, 401, 348/402, 405, 409, 412, 413, 415, 416, 419, 699; 382/236, 238, 251

[56] References Cited

U.S. PATENT DOCUMENTS 5,025,482  6/1991  Murakami et al. ............... 348/419
5,510,787  4/1996  Koster ............................... 348/415
5,526,052  6/1996  Ar ...................................... 348/405

Primary Examiner—Amelia Au

[57] ABSTRACT

A video signal encoder operable for distinguishing between errors resulting from a change in a video signal input to the encoder and errors resulting from ineffective quantization includes a quantized section and an unquantized section, with each section having a separate image predictor. A switch mechanism selectively provides each image predictor with a corresponding signal having a portion containing video data derived from a prior frame for use in predicting an image represented on a subsequent video frame. The signals are also provided to an image analysis unit for measuring motion of the image and for adjusting a quantization step size of a quantizer when quantization errors are detected.

16 Claims, 2 Drawing Sheets

VIDEO ENCODER WITH FEEDBACK CONTROL

BACKGROUND OF THE INVENTION

1. Field of the Invention

This invention broadly relates to an encoder configuration for the coding of video information. More particularly, the invention pertains to a feedback encoder having improved image analysis for estimating motion of an object depicted in a frame of a video signal. Most particularly, the present invention is directed to a feedback encoder having improved object motion estimation and quantizer control.

2. Description of Background Art

Video encoders are used for coding video information in the form of video frames into a continuous stream of bits for transmission to a receiver having a corresponding decoder. The decoder translates the encoded signal back to video information which, in turn, is displayed on a video screen or CRT. Video information is typically comprised of video frames wherein images of objects contained therein are represented by pixels having color components and wherein motion of images of objects is represented by motion vectors.

The amount of transmitted coded video information is of course limited by the bandwidth of the system in which the encoders operate. Thus, most if not all existing encoders employ various techniques for efficient use of the limited available bandwidth, such as quantizing the video information before transmission. To represent a relatively uniform or homogeneous image, for example, a fine quantization is required, whereas accurate representation of an active or busy image requires a course quantization. Thus, for maximum efficiency it is desirable to dynamically adjust the quantization step size as needed so that only an appropriate number of bits required for accurate representation of the video signal are transmitted. In addition, because a video information signal consists of a continuous stream or series of flames, to depict an image represented in a current frame on a screen that is displaying an existing image, the entire current frame need not be transmitted but, rather, only the differences or variations between the displayed frame and the current frame. Thus, often the existing image on the screen need only be altered to display the current frame image.

FIG. 1 depicts a prior art encoder, of the type described hereinabove, for coding video information. Such an encoder can be employed with direct television systems or CD ROM systems as well as with videophone technology wherein, for example, video information is transmitted over Integrated Services Digital Network (ISDN) lines. As shown in FIG. 1, the encoder 10 receives at any given time a portion of a video signal comprised of a series of successive-in-time video frames input from a camera 12. Each frame is digitized by an analog-to-digital (A/D) converter 14 and each digitized frame is divided into blocks by a block splitter 18 that supplies the encoder 10 with one block of video information at any given time.

An error signal representing the difference between the current block and an estimate of the current block is generated by a subtractor 20. The estimate consists of a prediction of the image of the current block derived from a predictor 42—which derives the prediction or estimate from the image of a previous block—as well as a displacement measurement of the image. The displacement measurement is typically in the form of a motion vector generated by a displacement estimator 44. The displacement estimator 44 measures a displacement between images by comparing the current block to a corresponding previous block that was stored in a frame store or memory 36. The resulting error signal is converted from the spatial domain to the frequency domain by a discrete cosine transform (DCT) unit 22 whereupon the frequency components of the error signal are quantized by a quantizer unit 24 operating at a preselected step size. The quantized error signal is divided at node 26 and supplied to an entropy coder 28 that also receives the corresponding displacement vector from the displacement estimator unit 44. The output of entropy code 28—i.e. the coded signal with its corresponding motion vector—is then input to a buffer 30 which regulates the bit rate provided to a transmitter (not shown) for transmitting the coded video information to a remote or downstream decoder.

The error signal from node 26 is also fed to an inverse discrete cosine transform (IDCT) unit 32 and is then added to the current predicted image at adder 34. The resulting signal is provided to the frame store 36 for use by predictor 42 and displacement estimator 44 in predicting an image for a corresponding macro block for a subsequent frame. It should be noted that if no error signal is present, i.e. the current block and its estimate are virtually identical, then only displacement of the image may exist. Thus, the displacement estimator 44 also supplies the generated motion vectors to the entropy coder 28. As also shown in FIG. 1, buffer 30 includes a control means 31 for adjusting the step size of the quantizer 24 in response to an overflow of the buffer, whereupon the quantizer step size is increased to reduce the quantity of bits generated.

In general, video encoders basically determine for each block of an image whether displacement vectors and DCT coefficients of an error signal need to be transmitted. In other words, an encoder determines whether an existing image on a screen needs to be altered or changed, and by how much, to depict a current image. This is accomplished by identifying significant changes between the previous image and the current image as well as determining whether the previous image displayed on a screen is a satisfactory representation of the corresponding image input by camera 12.

With continued reference to FIG. 1, and as stated above, the error signal input to DCT unit 22 is developed from a difference between a macro block from a current image and a prediction of that image, and a displacement measurement derived from a comparison of a current macro block with the previously transmitted image as stored in the frame store 36. The error signal input to DCT unit 22 may vary from the error signal output from IDCT unit 32 as a function of the step size used by the quantizer. For example, if a small step size or fine quantization is used, the output error signal from IDCT 32 will more closely resemble the error signal input to DCT 22 than if a large step size or coarse quantization is used. Thus, a drawback of prior art encoders, including the encoder depicted in FIG. 1, is that the error signal transmitted to the decoder may contain components representing a change in the image from a previous frame to a current frame as well as errors introduced by the quantizer 24 due to inefficient quantization of previous frames. Existing encoders do not distinguish between these two types of errors, resulting in inefficient quantizer control.

Another drawback of prior art encoders is that the control means 31 which controls the quantizer step size in the event of buffer overflow, etc. is dependent on the error signal which contains quantizer errors as well as image changes and, therefore, the quantization step size may be adjusted unnecessarily. In addition, since the displacement estimator 44 of FIG. 1 bases its displacement measurement only on the current block and a quantized signal of a previous block, the accuracy of the displacement measurement also suffers.

Some prior art systems attempt to alleviate the problem of distinguishing between the types of errors in the error signal by utilizing the original image, as opposed to the error signal, to control the quantizer step size independently of the controller feedback loop 31. Still other prior art systems attempt to alleviate the problem of the displacement measurement by measuring the displacement between the original current image and the original previous image. Although these prior art systems may yield improved quantizer control and improved displacement estimation, they also result in drift from one frame to the next because the new image is no longer tied or related to the previous image.

SUMMARY OF THE INVENTION

Accordingly, it would be desirable to have a video signal encoder that is capable of distinguishing between errors introduced as a result of inefficient quantization and errors based on changes in video information from a previous frame to a current frame. It would also be desirable to have a video signal encoder in which displacement estimation is at least partially based on an unquantized signal and that provides improved quantization control.

The present invention accomplishes these goals by providing a feedback encoder device for image analysis of an object represented by a video signal that is defined by a continuous stream or series of video frames. The encoder includes first and second image predictors for estimating, for each video frame, a predicted image of an object of the frame. The image predicted by the first image predictor is derived from a measurement of displacement of the object and a representation of a frame preceding the current frame. An error signal derived from the difference between a current video frame and the first predicted image of the current video frame is generated, and the error signal is quantized by a quantizer having an adjustable step size. The representation for each frame is formed of at least one of (1) the first predicted image of the preceding frame and a quantized version of the error signal of the preceding frame, and (2) the first predicted image of the preceding frame. An entropy coder codes the quantized error signal which is then provided to a transmitter for transmitting the coded quantized error signal to a decoder for display on a CRT screen or the like. The second image predictor estimates, for each frame, a second predicted image of the object. The second predicted image is derived from the measurement of displacement of the object and a signal input to the second image predictor. The signal to the second image predictor is formed of at least one of (1) the preceding video frame, and (2) a predicted image of the preceding video frame. An image analysis unit for determining, for each frame, the measurement of displacement of the object is also provided for supplying the displacement measurement to the entropy coder; the displacement measurement is derived from the representation of the preceding frame, the signal, and the current frame.

In the preferred embodiment, the image analysis unit also includes a quantizer control mechanism for adjusting the step size of the quantizer in the that event quantization errors are detected.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference numerals designate like elements throughout the several views.

DETAILED DESCRIPTION OF THE PRESENTLY PREFERRED EMBODIMENT

Figure 1:
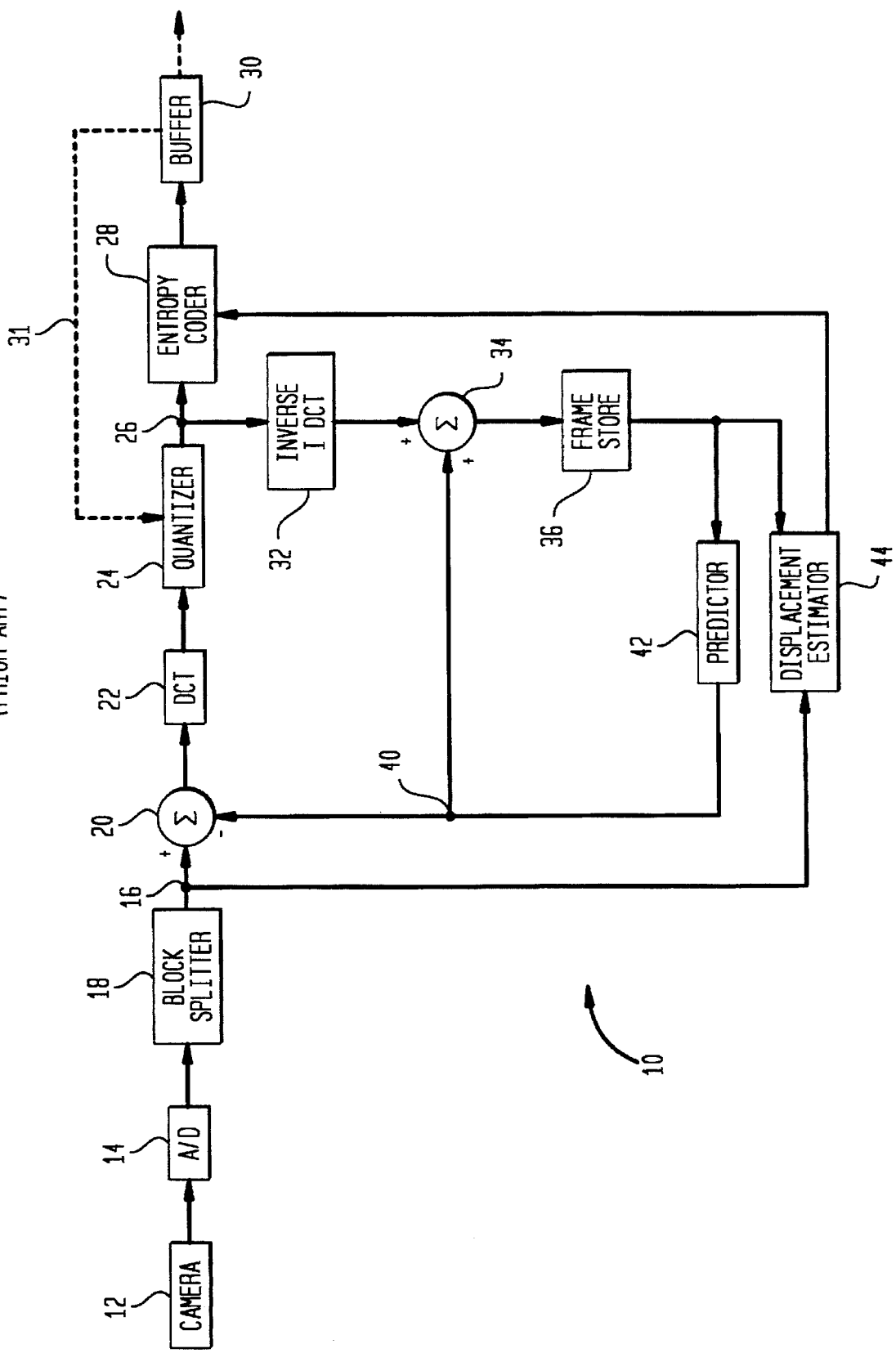
FIG. 1 is a block diagram of a prior art video encoder.
Figure 2:
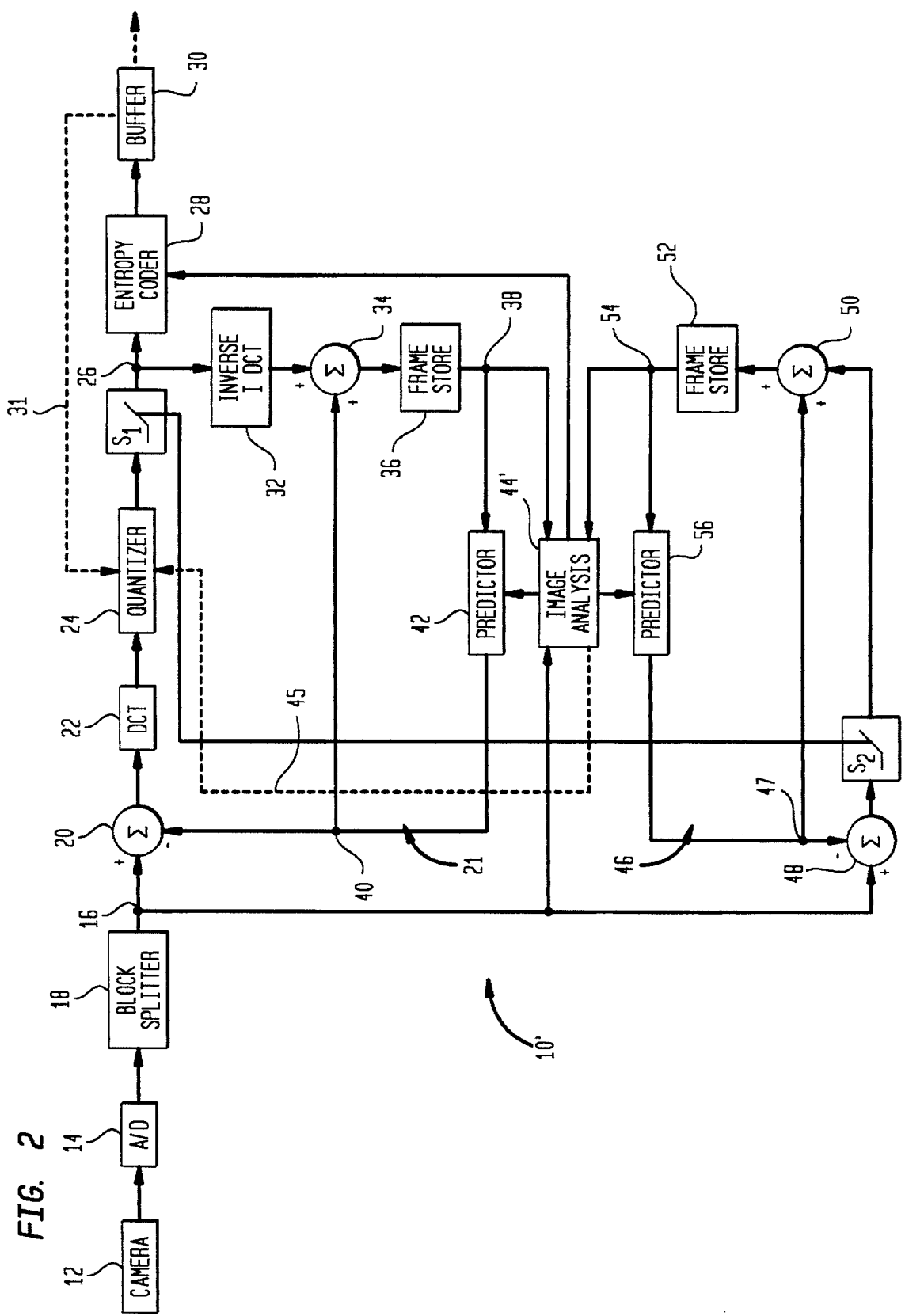
FIG. 2 is a block diagram of a video encoder constructed in accordance with the present invention.

With specific reference now to FIG. 2, a video encoder constructed in accordance with the present invention is by the general reference designated numeral 10'. As shown, and like the prior art encoder 10 of FIG. 1, encoder 10' receives video information from a camera 12 with the video information digitized by an analog-to-digital converter 14. The digitized video signal is divided into macro blocks by a block splitter 18 and input to the encoder 10' at a node 16. In the preferred embodiment, block splitter 18 divides each frame of an incoming video signal into square macro blocks of size sixteen by sixteen picture elements (pixels). As is known in the art, each block is represented by a motion vector identifying motion of an object from one frame to the next, and by discrete cosine transform coefficients representing the colors of the pixels defining the block.

In general, the encoder 10' is formed of two stages—a quantized stage 21 and an unquantized stage 46. With the exception of an added first switch $S_1$, the quantized stage 21 of encoder 10' operates in a manner similar to the prior art encoder 10 of FIG. 1. Specifically, first predictor 42 predicts the color components of a current macro block based on the corresponding previous-in-time (generally immediately preceding) macro block. The motion of an image defined in the current macro block is measured by an image analysis unit 44'—which operates in a manner similar to the displacement estimator 44 of the prior art encoder 10 and which connects the two stages 21, 46—and is provided to predictor 42. The incoming or current macro block from the current frame is input to the subtractor 20 and to image analysis block 14' as well as to a second subtractor 48. An error signal representing the difference between the current macro block and a predicted version of the current macro block, which includes a motion measurement of an image in the current block, is generated by subtractor 20. The predicted image is derived from a previous-in-time macro block. The error signal is then transformed to the frequency domain by discrete cosine transform (DCT) unit 22, and the transformed error signal is quantized by quantizer 24 which has an adjustable step size. The step size of quantizer 24 is controllable by control means 31 as in the prior art and, as more fully described below, by a second control means 45 connected to the image analysis unit 44'. Also, as more fully set forth below, the first switch $S_1$ connects the output of quantizer 24 to the entropy coder 28 and to the inverse discrete cosine transform (IDCT) unit 32 through node 26.

If the quantized error signal exceeds a preset threshold, then switch $S_1$ closes. In other words, if the difference between the current macro block and the predicted version of the current macro block is substantial, indicating that a change has occurred, then the error signal is provided to the entropy coder 28 and to the buffer 30 for transmission to a remote or downstream decoder, thereby effectuating the necessary changes to an image on a video screen or other display. The error signal is also provided to IDCT unit 32 for use by predictor 42 and image analysis unit 44' in predicting images and estimating the motion of a subsequent corresponding macro block, generally of the immediately following frame.

As stated above, each error signal for each macro block from a current frame is computed by utilizing a current macro block and a predicted image generated from a corresponding macro block of a previous frame. The macro blocks of the previous frame are stored in frame store unit 36. Thus, error signals exceeding a predetermined threshold value are supplied to and stored in the frame store unit 36 for use by the predictor unit 42 and image analysis unit 44' in estimating and predicting images and motion for the subsequent corresponding blocks.

With continued reference to FIG. 2, it will be recognized that the inverse discrete cosine transform of an error signal that has been quantized by quantizer 24 transforms the error signal back to the spatial domain, whereupon the predicted image of the current block is added thereto at adder 34. The resulting signal having a quantized portion (the "quantized signal") is stored in the frame store unit 36 for use, as explained above, by the predictor unit 42 and image analysis unit 44' in predicting the image and motion of the subsequent corresponding block.

Ideally, the inverse discrete cosine transform of the error signal should be identical to the error signal generated by subtractor 20. However, and as will be readily understood by those of ordinary skill in the art, the quantization step size of quantizer 24 may yield a difference between the error signal output by IDCT unit 32 and the error signal input to DCT unit 22. Specifically, if the quantization step size is small, resulting in a fine quantization, there will be little difference between these two versions of the error signal. However, if the quantization step size is large, resulting in a coarse quantization, the difference may be substantial and thus require a step size adjustment. In addition, even with efficient quantization, the error signal may be substantial due simply to a change from a prior macro block to a corresponding current macro block. Thus, and as set forth above, an encoder generating only the quantized signal cannot distinguish between errors present as a result of poor or inefficient quantization and errors resulting from a change between a current frame and a subsequent frame.

Accordingly, to alleviate this problem and distinguish quantization errors requiring a step size adjustment from video signal changes which may not require such an adjustment, the inventive encoder includes an unquantized stage 46. Like quantized stage 21, the unquantized stage 46 includes a subtractor 48, a switch $S_2$—which is connected to and operates synchronously with switch $S_1$—a second adder 50, a second frame store unit 52, and a second predictor unit 56. The unquantized stage 46 does not, however, include a quantizer, a DCT unit or an IDCT unit. Thus, when a current macro block is input to unquantized section 46 via subtractor 48, a second error signal comprising the difference between a predicted version of the current macro block and the actual current macro block is generated. If switch $S_2$ is closed, the second error signal and the predicted version are added in adder 50, resulting in a signal substantially identical to the current macro block. This signal is stored in frame store 52 for use by the second predictor 56 and the image analysis unit 44' in estimating the image and motion of a subsequent corresponding block.

It should be understood that the prediction and image analysis generated in the unquantized section 46 will not contain quantization errors. Since the image analysis unit 44' receives three inputs—namely (1) the signal corresponding to the prior frame retrieved from frame store 52, (2) the signal from the quantized section 21 retrieved from frame store 36, and (3) the actual current block—image analysis block 44' can more accurately measure motion of an image from a previous frame to a current frame. A determination can accordingly be made as to whether an existing error results from inefficient quantization, a change in the video signal information, or some combination thereof.

If the error results from inefficient quantization, then image analysis unit 44' will instruct the quantizer, via quantizer control means 45, to adjust the quantization step size for the current frame. This is preferably enabled by providing an appropriate instruction to quantizer 24. For example, if the resolution of an image on a CRT screen is unacceptable, the quantization step size may be decreased by providing an appropriate signal from image analysis block 44' to quantizer 24 so as to yield a more representative image. If, on the other hand, the change from a current signal to a subsequent signal is slight, then the quantizer can similarly be adjusted to a more coarse or large quantization step, on the basis of the relatively insignificant change that has occurred in the video signal from one frame to the next.

Having thus described the various elements and components of the inventive encoder 10', a brief description of its operation will now follow. Synchronously operable switches $S_1$ and $S_2$ close if the quantized version of the error signal exceeds a preset threshold value, e.g. when the output of quantizer 24 is large. When this occurs, an error signal representing a change in the video signal is provided to entropy coder 28 and buffer 34 for transmission to a decoder (not shown) for altering an existing image on a CRT screen. In addition, the quantized error signal is converted or transformed back to the spatial domain by IDCT unit 32, is added to the predicted image of the current block from which the error signal was derived, and is stored in frame store unit 36 for use in subsequent image analysis and prediction. The simultaneous closing of switch $S_2$ provides the current macro block to frame store unit 52 for use by predictor 56 and image analysis unit 44' in predicting and estimating the motion of the subsequent video block.

Upon input of the video block from the next original frame to encoder 10', the error signal is again computed by subtractor 20 and transformed to the frequency domain by DCT unit 22, and the transformed signal is quantized by quantizer 24. If the error signal is insubstantial, i.e. below threshold, then switch $S_1$ is opened, thereby indicating an insubstantial change in the pixels comprising the current macro block as compared to the prior macro block. In this situation, the error signal is accordingly not transferred or transmitted to the downstream decoder. However, motion of an image may still be present and, therefore, the image analysis unit 44' (which measures motion for objects present in a video frame) will measure the motion by comparing the current block with both the quantized signal of the prior frame and the unquantized signal of the prior frame for generating a motion vector that is output to entropy coder unit 28 for transmission to the decoder.

It should be noted that when switch $S_1$ opens, there is no error signal input to adder 34 for addition to the current predicted image of the current macro block. Only the current predicted image and the motion measurement are thus stored in the corresponding address location of frame store unit 36. In other words, the data stored in the corresponding location of frame store unit 36 does not contain any error signal components. Likewise, as switch $S_2$ is opened, the new data for a corresponding location in frame store unit 52 is simply comprised of the prior predicted image from image predictor 56 together with a motion measurement generated by image analysis unit 44'. Thus, as will be appreciated, by providing image analysis unit 44' with both a signal from a prior frame having a quantized portion and with a signal from the prior frame lacking a quantized portion, image analysis unit 44' can now determine whether the error signal is caused by inefficient quantization or by an actual change in the video signal content, or both. This determination may then be used to more effectively measure motion displacement and to more efficiently control quantizer 24.

Those skilled in the art will recognize that the individual elements and components of encoder 10' may, as a general matter of design choice, be implemented by a combination of hardware and/or software elements and the use of either or both is fully intended within the scope and contemplations of the present invention. For example, a single computer may be employed to perform the functions of the predictors 42, 56 and the image analysis unit 44'. In addition, the frame store units 36 and 52 may by way of example be comprised of computer memory.

Thus, while there have shown and described and pointed out fundamental novel features of the invention as applied to the presently preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. It is the intention, therefore, to be limited only as indicated by the scope of the claims appended hereto.

I claim:

1. A feedback encoder for image analysis of an object represented by a video signal defined by a continuous stream of successive-in-time video frames, said device comprising:

a first image predictor for estimating, for each said video frame, a first predicted image of an object of the frame, the first predicted image for each said frame being derived from a measurement of displacement of the object and a representation of a frame preceding the said each frame;

means for generating an error signal derived from a difference between a current video frame and the first predicted image of the current video frame;

a quantizer in communication with said error generating means for quantizing, at an adjustable step size, the error signal to define a quantized error signal;

for each said frame, said representation being formed of at least one of (1) the first predicted image of the preceding frame and the quantized error signal of the preceding frame, and (2) the first predicted image of the preceding frame;

an entropy coder for coding the quantized error signal;

a second image predictor for estimating, for each said frame, a second predicted image of the object of the said each frame, the second predicted image for each said frame being derived from the measurement of displacement of the object and a signal input to said second image predictor, said input signal being formed of at least one of (1) the preceding video frame, and (2) a predicted image of the preceding video frame; and image analysis means for determining, for each said frame, the measurement of displacement of the object, said measurement being provided to said entropy coder and being derived from the representation of the preceding frame, the input signal, and the current frame.

2. The encoder of claim 1, further comprising first memory means for storing said representation and for providing said representation to said first image predictor and to said image analysis means, and second memory means for storing said input signal and for providing said input signal to said second predictor and to said image analysis means.

3. The encoder of claim 2, further comprising switch means responsive to the quantized error signal, said switch means having a closed condition for providing, when said quantized error signal exceeds a threshold value, the quantized error signal to said first memory means and the current video frame to said second memory means.

4. The encoder of claim 3, wherein said switch means has an opened condition, said switch means being in said opened condition when said quantized error signal does not exceed said threshold value whereby the first predicted image is provided to said first memory means and the second predicted image is provided to said second memory means.

5. The encoder of claim 3, further comprising a buffer connected to said entropy coder for regulating a rate at which the coded quantized error signal and said displacement measurement are transmitted to a decoder for display of the object.

6. The encoder of claim 5, wherein said buffer includes control means for adjusting a quantization step size of the quantizer.

7. The encoder of claim 1, wherein said image analysis means includes control means for adjusting a quantization step size of the quantizer.

8. The encoder of claim 6, wherein said image analysis means includes control means for adjusting a quantization step size of the quantizer.

9. A feedback encoder for image analysis of an object represented by a video signal defined by a continuous stream of successive-in-time video frames, said device comprising;

a first image predictor for estimating, for each said video frame, a first predicted image of an object of the frame, the first predicted image for each said frame being derived from a measurement of displacement of the object and a representation of a frame preceding the said each frame;

an error generator for generating an error signal derived from a difference between a current video frame and the first predicted image of the current video frame;

a quantizer in communication with said error generator for quantizing, at an adjustable step size, the error signal to define a quantized error signal;

for each said frame, said representation being formed of at least one of (1) the first predicted image of the preceding frame and the quantized error signal of the preceding frame, and (2) the first predicted image of the preceding frame;

an entropy coder for coding the quantized error signal;

a second image predictor for estimating, for each said frame, a second predicted image of the object of the said each frame, the second predicted image for each said frame being derived from the measurement of displacement of the object and a signal input to said second image predictor, said input signal being formed of at least one of (1) the preceding video frame, and (2) a predicted image of the preceding video frame; and an image analyzer for determining, for each said frame, the measurement of displacement of the object, said measurement being provided to said entropy coder and being derived from the representation of the preceding frame, the input signal, and the current frame.

10. The encoder of claim 9, further comprising a first memory for storing said representation and for providing said representation to said first image predictor and to said image analyzer, and a second memory for storing said input signal and for providing said input signal to said second predictor and to said image analyzer.

11. The encoder of claim 10, further comprising a switch responsive to the quantized error signal, said switch having a closed condition for providing, when said quantized error signal exceeds a threshold value, the quantized error signal to said first memory and the current video frame to said second memory.

12. The encoder of claim 11, wherein said switch has an opened condition, said switch being in said opened condition when said quantized error signal does not exceed said threshold value whereby the first predicted image and the displacement measurement are provided to said first memory and the second predicted image and the displacement measurement are provided to said second memory.

13. The encoder of claim 11, further comprising a buffer connected to said entropy coder for regulating a rate at which the coded quantized error signal and said displacement measurement are transmitted to a decoder for display of the object.

14. The encoder of claim 13, wherein said buffer includes a control mechanism for adjusting a quantization step size of the quantizer.

15. The encoder of claim 9, wherein said image analyzer includes a control mechanism for adjusting a quantization step size of the quantizer.

16. The encoder of claim 14, wherein said image analyzer includes a control mechanism for adjusting a quantization step size of the quantizer.

* * * * *